United States Patent [19]

Wisdom et al.

[11] 3,894,747

[45] July 15, 1975

[54] METHOD AND APPARATUS FOR LOWERING A TRAILER TO THE GROUND

[76] Inventors: Gerald F. Wisdom, 337 Delaware; Larry L. Wisdom, Kings Ct., both of Sterling, Colo. 80751

[22] Filed: May 20, 1974

[21] Appl. No.: 471,241

[52] U.S. Cl. ............ 280/30; 280/43.11; 280/150.5; 280/415 B; 254/86 H; 214/506
[51] Int. Cl. ............................................. B62d 53/06
[58] Field of Search ....... 280/475, 30, 43.11, 43.23, 280/418, 150.5, 415 R, 415 B, 423 R; 214/506, 505

[56] References Cited
UNITED STATES PATENTS

| | | | |
|---|---|---|---|
| 2,590,962 | 4/1952 | Gurton et al. | 280/418 UX |
| 2,751,234 | 6/1956 | Couse | 280/30 |
| 3,003,787 | 10/1961 | Woolslayer et al. | 280/423 R X |
| 3,261,487 | 7/1966 | Talbert | 280/43.11 X |
| 3,292,802 | 12/1966 | Hutchinson | 214/506 |
| 3,346,131 | 10/1967 | Lundell | 214/506 |
| 3,633,776 | 1/1972 | Moore | 280/43.23 X |

*Primary Examiner*—Leo Friaglia
*Attorney, Agent, or Firm*—Burton, Crandell & Polumbus

[57] ABSTRACT

A trailer incorporating the features of the subject invention has a wheel assembly near the trailing end and a scissors-type lift mechanism near the leading end, with a fulcrum support intermediate the wheel assembly and lift mechanism. The method of lowering the trailer to the ground includes the steps of lowering the leading end of the trailer to the ground with the lift mechanism causing the trailing end to pivot about the fulcrum support into engagement with the ground, further raising the leading end of the trailer to raise the fulcrum support off the ground, removing the fulcrum support, and finally lowering the leading end of the trailer until the entire trailer is in flat engagement with the ground.

12 Claims, 9 Drawing Figures

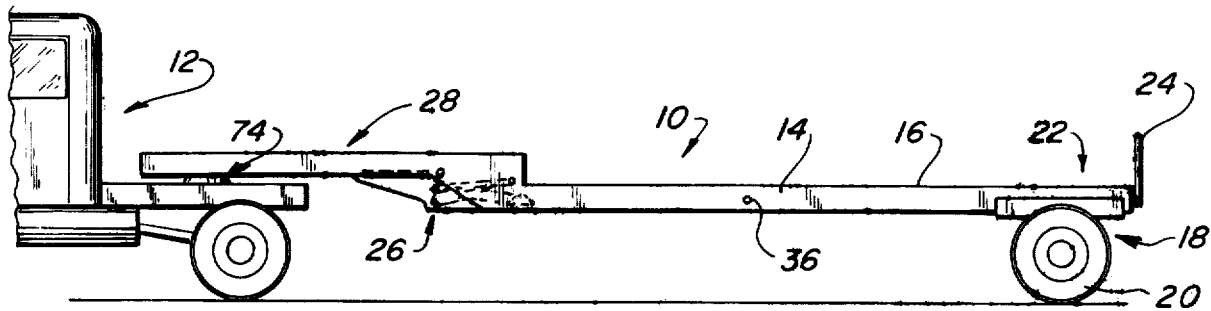
Fig_1
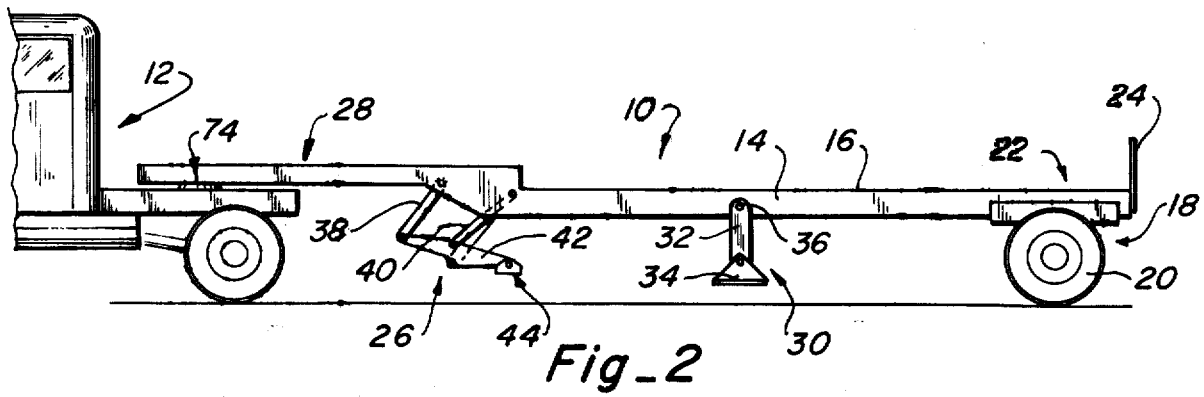
Fig_2
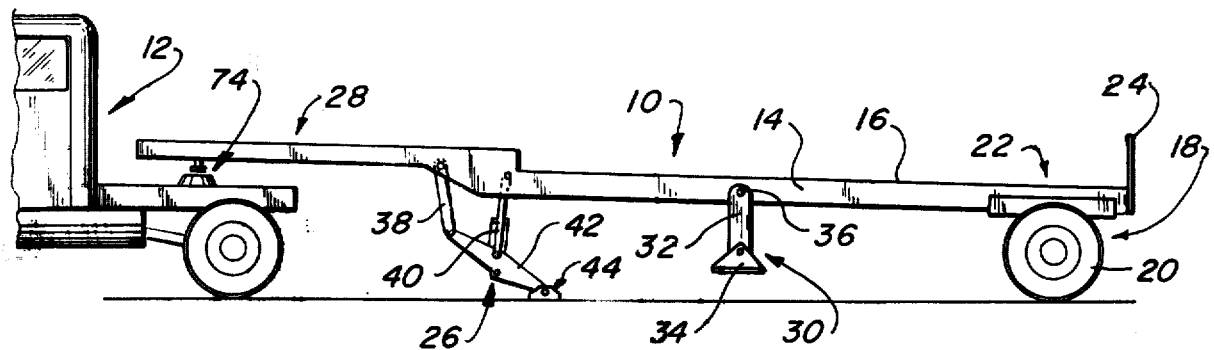
Fig_3
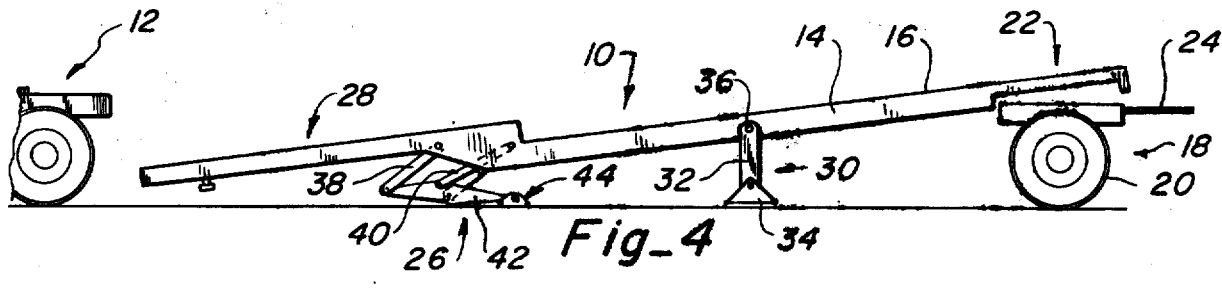
Fig_4

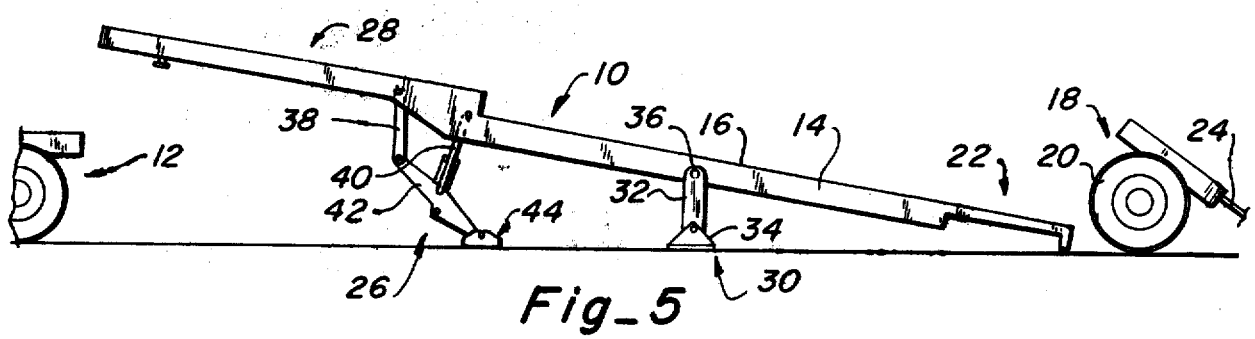
Fig_5
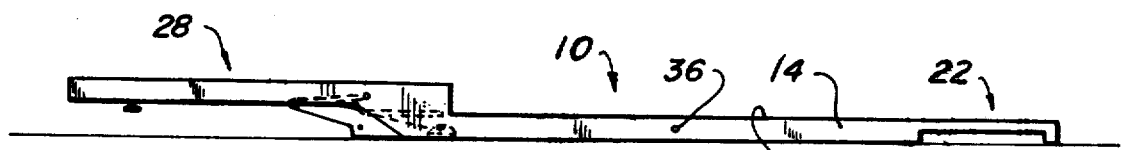
Fig_6
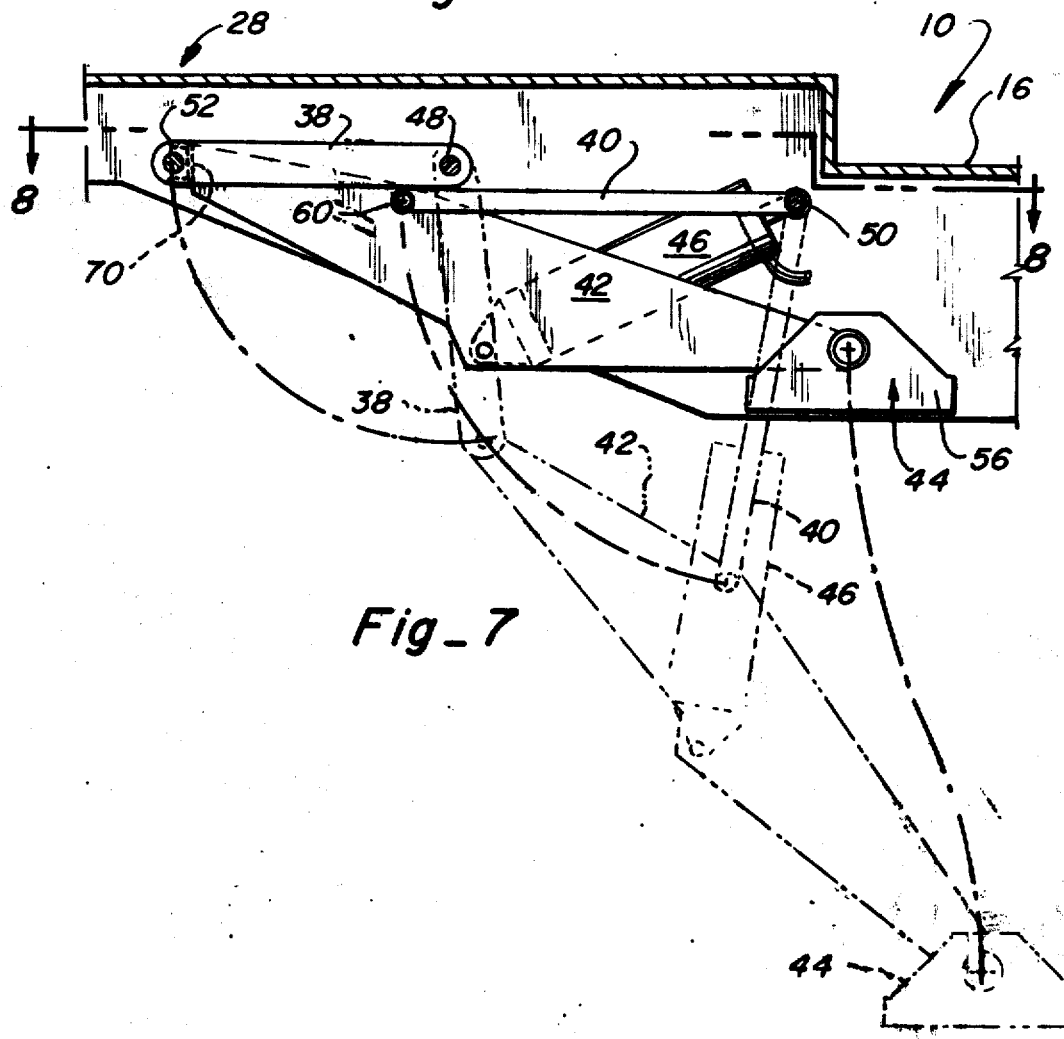
Fig_7

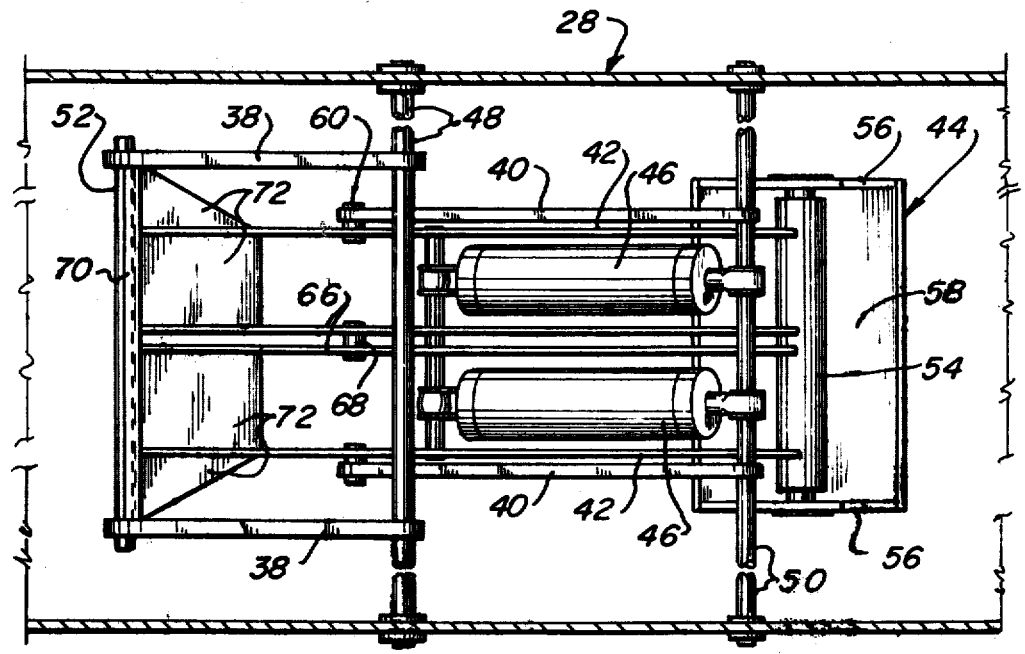
Fig_8
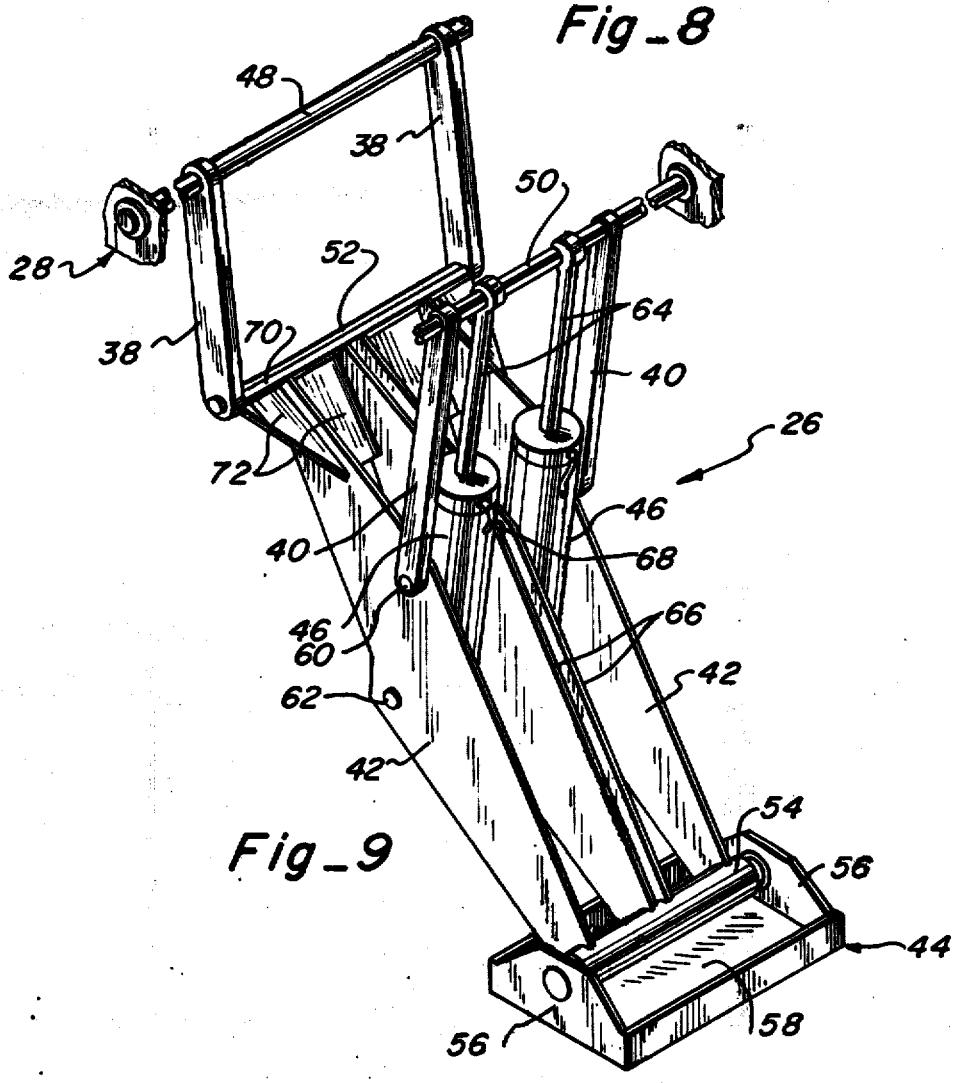
Fig_9

3,894,747

METHOD AND APPARATUS FOR LOWERING A TRAILER TO THE GROUND

BACKGROUND OF THE INVENTION

The present invention relates generally to a method and apparatus for desirably positioning a trailer bed for loading operations, and more particularly to a method and apparatus for lowering a trailer bed into flat engagement with the ground to facilitate loading and unloading of cargo.

DESCRIPTION OF THE PRIOR ART

In one prior art system for lowering a trailer bed into flat engagement with the ground, a winch truck is used to lower the leading end of the trailer to the ground and then through a pulley system allow the rear axle of the trailer bed to be removed and driven away by the winch truck. A system of this type is not totally unsatisfactory, but does require the services of a winch truck which are not always available.

In other systems for lowering a trailer bed into flat engagement with the ground, power cylinders are positioned around the trailer bed and project thereabove so that upon actuation they can raise or lower the bed as necessary to remove the wheel assembly and subsequently place the trailer bed on the ground. A disadvantage in a system of this type is that the lift mechanisms project above the trailer bed and, therefore, restrict and inhibit removal of the cargo on the trailer bed, particularly when the cargo is extremely large requiring that the side and ends of the trailer bed be clear for safe and reliable removal.

OBJECTS OF THE INVENTION

It is an object of the present invention to provide a new and improved system for lowering a trailer into flat engagement with the ground and subsequently repositioning the trailer in its raised use position.

It is another object of the present invention to provide a new and improved apparatus for lowering a trailer into flat engagement with the ground which is reliable and safe in operation.

It is another object of the present invention to provide a new and improved apparatus for lowering a trailer into flat engagement with the ground which leaves the trailer free of upwardly extending obstructions, which might inhibit loading or unloading of the trailer.

BRIEF DESCRIPTION OF THE DRAWINGS

FIGS. 1 through 6 are diagrammatic side elevation operational views illustrating the method of lowering a trailer into flat engagement with the ground.

FIG. 7 is a diagrammatic side elevation of the lift mechanism of the apparatus in a retracted position with an extended position shown in phantom lines.

FIG. 8 is a fragmentary horizontal section taken through a trailer bed illustrating a top view of the lift mechanism.

FIG. 9 is a perspective view of the lift mechanism in an extended position.

DESCRIPTION OF THE PREFERRED EMBODIMENT

Referring first to FIGS. 1 through 6, a trailer 10 is seen conventionally mounted upon and removably connected to a tractor or tow vehicle 12. The trailer 10, in the disclosed form, has a bed portion 14 with an upper flat cargo supporting surface 16. A conventional wheel assembly 18 having laterally spaced wheels 20 is removably connected to the undersurface of the trailer 10 in a conventional manner adjacent the trailing end 22 thereof. The wheel assembly 18 is of the type which is easily connected to or removed from the trailer bed as with bolts (not shown) and a locking tail gate mechanism 24.

A lift mechanism 26, which will be described in more detail hereinafter, is mounted to the undersurface of the trailer bed 14 near the leading end 28 thereof as will be appreciated from the following description, the lift mechanism is the prime operative component of the apparatus.

Fulcrum support means 30 are mounted to the trailer bed 14 intermediate the wheel assembly 18 and the lift mechanism 26 preferably such that the portion of the trailer forwardly of the fulcrum support is heavier than that rearwardly of the support and such that it serves as a pivotal support for the trailer bed during a lowering or raising operation. While the fulcrum support means 30 could be of numerous types, in the disclosed form, the fulcrum support means are in the form of a pair of identical spaced supports each having a rigid upright arm portion 32 and a lower abutment head 34 adapted to positively engage the ground when the weight of the trailer is placed thereupon. The fulcrum supports are removably secured on pivot shafts 36 by removable pins or the like (not shown), so that the fulcrum supports can be easily mounted upon or removed from the pivot shafts in a quick and simple manner. The fulcrum supports could, however, be permanently mounted on the sides of the trailer so as to be swingable between a horizontal position immediately adjacent the trailer bed and a vertical use position.

Looking now more particularly at the lift mechanism 26, as illustrated in FIGS. 7 through 9, it can be seen to have a first pair of upper link members 38, a second pair of upper link members 40, a pair of main arm members 42, an abutment head 44, and hydraulic power lift means 46 for moving the mechanism from a retracted transport position, as shown in FIG. 1, to an extended lift position, as shown in FIG. 5. The first pair of link members 38 have their upper ends rigidly secured to opposite ends of a first pivot rod 48 pivotally connected to the trailer bed 14 in any convenient manner so that the first link members 38 are free to pivot in spaced vertical planes about the rod 48. The second link members 40 have their upper ends rigidly connected to a second pivot rod 50 which is also pivotally connected to the underside of the trailer bed in a convenient manner whereby the second link members are also free to pivot in laterally spaced vertical planes. As can be appreciated by referring to FIG. 1, the first pivot rod 48 is connected to the trailer bed at a location which is longitudinally spaced relative to the trailer bed, from the second pivot rod 50 and is at a slightly higher elevation than the second pivot rod when the trailer bed is horizontally disposed.

The lower ends of the first link members 38 are rigidly connected to a third pivot rod 52 which in turn is pivotally connected to one end of the main arm members 42. The main arm members 42 are generally diamond shaped plates which are each movable in parallel vertical planes. The opposite ends of the main arm members 42 are rigidly connected to a fourth pivot rod 54, which in turn is pivotally connected to opposite end plates 56 of the abutment head 44 which has a heavy enlarged lower base portion 58 so that the abutment head is maintained by gravity in a generally horizontal orientation.

The lower ends of the second pair of link members 40 are pivotally connected to the upper edges of the main arm members 42 by a pair of co-axial pivot rods 60 which are pivotally connected to the main arm members at a location which is approximately twice as far from the fourth pivot rod 54 as from the third pivot rod 52. It will thus be appreciated that the main arm members 42 are swingably supported by the first and second pair of link members 38 and 40 respectively, so that the entire assemblage is movable between a retracted transport position, as illustrated in FIG. 1, and an extended use position, such as shown in FIG. 5.

The hydraulic power cylinders 46 which operate to move the lift mechanism 26 between the retracted and extended positions, are pivotally anchored at their lower ends to a sixth pivot rod 62 which in turn is fixedly connected to the lower edges of the main arm members 42 at locations which are approximately equally spaced from the third and fourth pivot rod members 52 and 54 respectively. The extensible actuating rods 64 of each of the hydraulic cylinders are pivotally connected at their distal ends to the second pivot rod 50. It can, therefore, be appreciated that the extension of the hydraulic cylinders will force a displacement of the second pivot rod 50 from the pivot rod 62 causing the lift mechanism to extend and thereby lift the trailer 14 when the abutment head 44 is in engagement with the ground. Similarly, a withdrawal of the actuating rods 64 draws the pivot rod 62 upwardly, and due to the first and second pairs of link members 38 and 40 respectively, causes the pivot rod 62 to swing through a generally circular arc (FIG. 7) and thereby draw the lift mechanism into the retracted position of FIG. 1. In the retracted position, the first and second pair of link members lie in generally parallel adjacent relationship with the abutment head and main arm members, drawn up into closely adjacent relationship with the underside of the trailer.

To give added strength to the lift mechanism, a pair of closely spaced rigidifying arm members 66 are rigidly connected at the lower end to the fourth pivot rod 54 at the approximate longitudinal center of the rod and at the opposite end to the third pivot rod 52. These arm members are bridged by a spacer 68 for optimum strength and serve as an intermediate brace, so that the lift mechanism is capable of supporting large loads. Further, a channel member 70 interconnects the ends of the main arm members 42 which are pivotally connected to the third pivot rod 52 and gussets 72 extend between the channel member 70 and each of the main arm members 42 and the rigidifying arm members 66 to give lateral support to these plate-like members. The lift mechanism is preferably made with strong steel component parts so that it is capable of lifting the heavy loads which may be supported on the trailer bed.

Since the lift mechanism is connected to the trailer bed by longitudinally spaced laterally extending pivot rods, it gives adequate longitudinal support to the trailer so that the trailer cannot collapse either in a forward or rearward direction when supported by the hoist. Also, the hoist link members are laterally spaced to give lateral support so that the trailer cannot collapse in either lateral direction. It should also be noted that the lift mechanism is positioned totally beneath the trailer bed and, therefore, does not protrude above the supporting surface of the trailer bed in any position. This not only is advantageous when loading and unloading the trailer bed since there are no obstructions, but during transport of the trailer, the lift mechanism can be retracted into an out-of-the-way-position closely adjacent the undersurface of the trailer.

Looking now at the method of lowering the trailer into flat engagement with the ground, reference is first made to FIG. 1 wherein the lift mechanism 26 is in its retracted transport position, and the leading end 28 of the trailer bed 14 is conventionally connected to the tow vehicle 12, such as by a fifth wheel 74. The leading end 28 of the trailer is first released from its connection to the tow vehicle and the lift mechanism is actuated, as shown in FIG. 2, until the abutment head 44 engages the ground and subsequently lifts the leading end of the trailer from the tow vehicle as shown in FIG. 3. The tow vehicle is then driven out from beneath the trailer and the lift mechanism is retracted allowing the leading end of the trailer bed to the ground. Prior to lowering the leading end of the trailer bed to the ground, the fulcrum supports 30 are mounted upon the pivot shafts 36 at opposite sides of the trailer so that when the leading end of the trailer is lowered to the ground, the trailing end 22 of the trailer is caused to pivot about the fulcrum supports 30 and be raised off the ground. Before the trailing end of the trailer bed is lifted, the wheel assembly 18 is disconnected from the trailer bed in a conventional manner whereby when the leading end of the trailer bed engages the ground, or comes close thereto as illustrated in FIG. 4, the wheel assembly is free of the trailer bed and can be rolled out from beneath the trailer bed. Next, the lift mechanism is extended to raise the leading end of the trailer causing the trailing end to drop into engagement with the ground due to its pivotal motion about the fulcrum supports as shown in FIG. 5. The leading end of the trailer is then further raised so that the fulcrum supports are raised off the ground where they are free to be removed. After the fulcrum supports have been removed from the trailer bed, the lift mechanism is retracted into its transport position, thereby causing the leading end of the trailer bed to be lowered until the trailer bed is in flat engagement with the ground, wherein it can be easily loaded or unloaded without obstruction from the component parts of the apparatus which facilitated the positioning of the trailer bed on the ground.

The aforementioned steps can be followed in a reverse order to raise the trailer bed and mount it upon the tow vehicle so that it is in position for transport to another location.

Although the present invention has been described with a certain degree of particularity, it is understood that the present disclosure has been made by way of example and that changes in details of structure may be made without departing from the spirit thereof.

What is claimed is:

1. In a system for lowering a trailer bed to the ground wherein the trailer bed is supported near one end by a removable wheel assembly, the improvement comprising, a lift mechanism mounted on the underside of said trailer bed near the end thereof opposite said one end, and support means pivotally and removably connected to said trailer bed intermediate said lift mechanism and the wheel assembly whereby said lift mechanism is operative to pivot said trailer bed about said support means to allow the wheel assembly to be removed from the trailer bed and to allow the trailer bed to be lowered to the ground.

2. In the system of claim 1 wherein said lift mechanism is disposed completely between the side edges of said trailer bed.

3. In the system of claim 1 wherein said support means comprises a pair of rigid leg members pivotally connected to opposite sides of the trailer bed, the leg members each being spaced substantially equivalent distances from opposite ends of the trailer bed.

4. In the system of claim 1 wherein said lift mechanism is connected to the underside of said trailer bed at spaced locations along the length of the bed.

5. In the system of claim 4 wherein said lift mechanism includes at least two pair of laterally spaced link members and wherein pairs of link members are mounted in longitudinally spaced relationship for cooperation in reciprocally moving abutment means operatively connected thereto.

6. In the system of claim 4 wherein said link members are pivotally connected to elongated main arm members at spaced locations along the length of the arm members and wherein abutment means is connected to said main arm members at one end for selectively engaging the ground in operation of the lift mechanism.

7. In the system of claim 6, wherein said lift mechanism includes hydraulic power means for moving the mechanism between an extended position wherein said abutment means engages the ground and a retracted position wherein the component parts of the mechanism are in folded closely adjacent relationship with the underside of the trailer bed.

8. In the system of claim 7 wherein said hydraulic power means is connected at one end to the underside of the trailer bed and at the opposite end to an intermediate location on said main arm members.

9. A method of lowering a trailer bed from a raised generally horizontal position into flat engagement with the ground wherein said trailer bed is supported near one end by a removable wheel assembly and near its opposite end by a vertical lift mechanism, comprising the steps of:

positioning a fulcrum means at an intermediate location between said wheel assembly and the lift mechanism, lowering said opposite end with the lift mechanism to raise the said one end due to pivotal movement about said fulcrum means, removing the wheel assembly at said one end from the trailer bed, raising said opposite end with the lift mechanism causing one end to pivot about the fulcrum means until it is in engagement with the ground, further raising said opposite end so that the fulcrum means is free to be removed, removing the fulcrum means, and lowering said opposite end into engagement with the ground so that the trailer bed lies flat on the ground.

10. The method of claim 9 wherein the step of positioning the fulcrum means consists of pivotally connecting the fulcrum means to the trailer bed.

11. The method of claim 10, wherein the step of removing the fulcrum means consists of pivotally moving the fulcrum means from a vertical position wherein it supports an intermediate portion of the trailer bed to a generally horizontal position along the side of the trailer bed.

12. The method of claim 9 wherein said trailer bed is initially supported at said opposite end by a tow vehicle and further including the steps of raising said opposite end with the lift mechanism so that it is removed from the tow vehicle, and moving the tow vehicle out from beneath said opposite end before said opposite end is lowered to the ground to raise said one end.

* * * * *

UNITED STATES PATENT AND TRADEMARK OFFICE
Certificate

Patent No. 3,894,747  Patented July 15, 1975

Gerald F. Wisdom and Larry L. Wisdom

Application having been made by Gerald F. Wisdom and Larry L. Wisdom, the inventors named in the patent above identified, for the issuance of a certificate under the provisions of Title 35, Section 256, of the United States Code, deleting the name of Larry L. Wisdom as a joint inventor, and a showing and proof of facts satisfying the requirements of the said section having been submitted, it is this 18th day of April 1978, certified that the name of the said Larry L. Wisdom is hereby deleted from the said patent as a joint inventor with the said Gerald F. Wisdom.

FRED W. SHERLING,
*Associate Solicitor.*